United States Patent
Silverstein et al.

(10) Patent No.: US 12,046,245 B2
(45) Date of Patent: Jul. 23, 2024

(54) DYNAMICALLY RESOLVING NAMES AND ACRONYMS

(71) Applicant: International Business Machines Corporation, Armonk, NY (US)

(72) Inventors: Zachary A. Silverstein, Jacksonville, FL (US); Tiberiu Suto, Franklin, NY (US); Jonathan D. Dunne, Dungarvan (IE); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 17/023,667

(22) Filed: Sep. 17, 2020

(65) Prior Publication Data

US 2022/0084527 A1    Mar. 17, 2022

(51) Int. Cl.
| | |
|---|---|
| G10L 17/06 | (2013.01) |
| G06F 40/279 | (2020.01) |
| G06Q 10/105 | (2023.01) |
| G06Q 30/018 | (2023.01) |
| G06Q 50/26 | (2024.01) |
| G10L 15/26 | (2006.01) |
| H04L 65/1083 | (2022.01) |
| H04L 65/403 | (2022.01) |

(52) U.S. Cl.
CPC ............ *G10L 17/06* (2013.01); *G06F 40/279* (2020.01); *G06Q 10/105* (2013.01); *G06Q 30/0185* (2013.01); *G06Q 50/265* (2013.01); *G10L 15/26* (2013.01); *H04L 65/1083* (2013.01); *H04L 65/403* (2013.01)

(58) Field of Classification Search
CPC ....... G10L 17/06; G10L 15/26; G06Q 10/105; G06Q 30/0185; G06Q 50/265; H04L 65/403; H04L 65/1083; G06F 40/279
See application file for complete search history.

(56) References Cited

U.S. PATENT DOCUMENTS

| | | | |
|---|---|---|---|
| 6,346,952 B1 | 2/2002 | Shtivelman | |
| 6,393,460 B1 | 5/2002 | Gruen | |
| 6,606,644 B1 | 8/2003 | Ford | |
| 9,390,081 B2* | 7/2016 | Anders | H04L 51/063 |
| 10,496,683 B2 | 12/2019 | Franceschini | |
| 10,607,609 B2* | 3/2020 | Sommers | G06V 20/20 |
| 10,867,610 B2* | 12/2020 | Diamant | G10L 15/26 |
| 11,095,468 B1* | 8/2021 | Pandey | H04L 12/1831 |
| 11,545,156 B2* | 1/2023 | Zeng | G06N 20/00 |
| 11,640,422 B2* | 5/2023 | Esponda | G06F 40/242 |
| | | | 707/736 |
| 11,658,835 B2* | 5/2023 | Behar | H04L 12/1822 |
| | | | 709/203 |
| 2005/0038856 A1 | 2/2005 | Krishnasamy | |
| 2005/0055450 A1 | 3/2005 | Gang | |

(Continued)

OTHER PUBLICATIONS

Harris, Christopher G., and Padmini Srinivasan, "My Word! Machine versus Human Computation Methods for Identifying and Resolving Acronyms", 2019, Computación y Sistemas, vol. 23, No. 3, pp. 893-904. (Year: 2019).*

(Continued)

*Primary Examiner* — Daniel C Washburn
*Assistant Examiner* — James Boggs
(74) *Attorney, Agent, or Firm* — Michael O'Keefe (57) ABSTRACT

At least one target in a speech of a first speaker during an electronic conference is identified. A closest vector between the identified target and a group of possible matches for the target is determined. A most similar match for the identified target is determined based on a current usage context for the identified target, a history of stored information associated with the first speaker and the identified target, and the determined closest vector. The most similar match to a set of participants of the electronic conference is displayed.

18 Claims, 4 Drawing Sheets

(56) References Cited

U.S. PATENT DOCUMENTS

| | | | |
|---|---|---|---|
| 2009/0193327 A1* | 7/2009 | Roychoudhuri | G06F 40/169 715/231 |
| 2013/0346069 A1* | 12/2013 | Huang | G06F 40/295 704/9 |
| 2014/0195449 A1 | 7/2014 | Komissarchik | |
| 2015/0100922 A1* | 4/2015 | Lefebvre | G06Q 30/0241 715/810 |

OTHER PUBLICATIONS

Charbonnier, Jean, and Christian Wartena, "Using Word Embeddings for Unsupervised Acronym Disambiguation", Aug. 2018, Proceedings of the 27th International Conference on Computational Linguistics, pp. 2610-2619. (Year: 2018).*

Thakker, Aditya, Suhail Barot, and Sudhir Bagul, "Acronym Disambiguation: A Domain Independent Approach", Dec. 2017, arXiv preprint arXiv:1711.09271. (Year: 2017).*

Tur, G., A. Stolcke, L. Voss, S. Peters, D. Hakkani-Tür, J. Dowding, B. Favre et al., "The CALO Meeting Assistant System", Aug. 2010, IEEE Transactions on Audio, Speech and Language Processing, vol. 18, No. 6, pp. 1601-1611. (Year: 2010).*

Lin et al., "Knowledge Map Creation and Maintenance for Virtual Communities of Practice", Proceedings of the 36th Hawaii International Conference on System Sciences, 0-7695-1874-5/03, IEEE, 2003, 10 Pages.

Waksman et al., "Promotion of the use of ICT by the agro-food sector", EFITA 2005 Proceedings, 2005 EFITA/WCCA Joint Congress on IT in Agriculture, Jul. 25-28, 2005, Vila Real, Portugal, 4 Pages.

* cited by examiner

FIG. 4

DYNAMICALLY RESOLVING NAMES AND ACRONYMS

BACKGROUND

The present invention relates generally to the field of electronic conferences (i.e., e-cons), and more particularly to dynamically resolving incomplete names and acronyms for participants in the e-con.

Electronic conferences, or e-con for short, are popular tools for many businesses today. An e-con allows people to "meet" regardless of where they are located, within the same state, within the same country, or anywhere across the globe where Internet access is available. E-cons are used for both intracompany and intercompany communications. Any number of reasons exist for why an e-con is preferable to a face-to-face meeting—some examples include reducing travel expenses, meeting quickly to resolve a technical problem, and minimizing the spread of a virus during a health crisis. Information can be shared and discussed during an e-con almost as well as if the e-con participants were sitting across from one another at the same table.

SUMMARY OF THE INVENTION

Embodiments of the present invention include an approach for dynamically resolving incomplete names and acronyms for participants in an electronic conference. In one embodiment, at least one target in a speech of a first speaker during an electronic conference is identified. A closest vector between the identified target and a group of possible matches for the target is determined. A most similar match for the identified target is determined based on a current usage context for the identified target, a history of stored information associated with the first speaker and the identified target, and the determined closest vector. The most similar match to a set of participants of the electronic conference is displayed.

DETAILED DESCRIPTION

Embodiments of the present invention recognize that electronic conferences (i.e., e-cons) are a popular tool for communication. However, sometimes a name of a person is mentioned, and it is not clear who the name refers to (e.g., 'Jimbo' could be 'James Smith', 'Jim Anderson', or 'Jimmy Fredricks'). Further, an acronym may be used in an e-con that is not known by all of the e-con participants (e.g., during a metallurgical discussion, the presenter states that "'FCC' structures are more likely to be ductile versus a 'BCC' structure", where 'FCC' is a face-centered cubic structure and 'BCC' is a body-centered cubic structure). A tool is needed that is able to dynamically resolve incomplete names and acronyms for participants in an electronic conference.

Embodiments of the present invention recognize that there may be a method, computer program product, and computer system for dynamically resolving incomplete names and acronyms for participants in an electronic conference. The method, computer program product, and computer system improve the field of electronic conferences by providing a dynamic means of automatically resolving content presented in the electronic conference (i.e., e-con) that may not be understood by all of the participants. This automatic resolution does not disrupt the e-con in any way. A benefit of this automatic resolution is a savings in bandwidth during the e-con. For example, because of the automatic resolution of content in real-time during the e-con, a participant in the e-con has a question resolved before said participant can submit the question regarding an acronym or a name of a person. Because the question was never submitted, e-con bandwidth was not consumed. Further, participant attentiveness is improved as participants are not distracted by searching for a referenced name of a person in an address book or trying to look up a referenced acronym in an Internet search engine. In an embodiment, an e-con is identified. In the embodiment, a speaker is identified, and the speech of the speaker is converted into text. Further in the embodiment, a target (e.g., a name or an acronym) is identified. Further in the embodiment, the usage context of the target is determined. In the case of the target being the name of a person, the closest vector to the target is determined and the name of the person is determined based on the usage context and the closest vector; further, the name is displayed to the e-con participants. In the case of the target being an acronym, the acronym is identified based on searching a database of known acronyms while considering the determined usage context; further, the identified acronym is displayed to the e-con participants.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
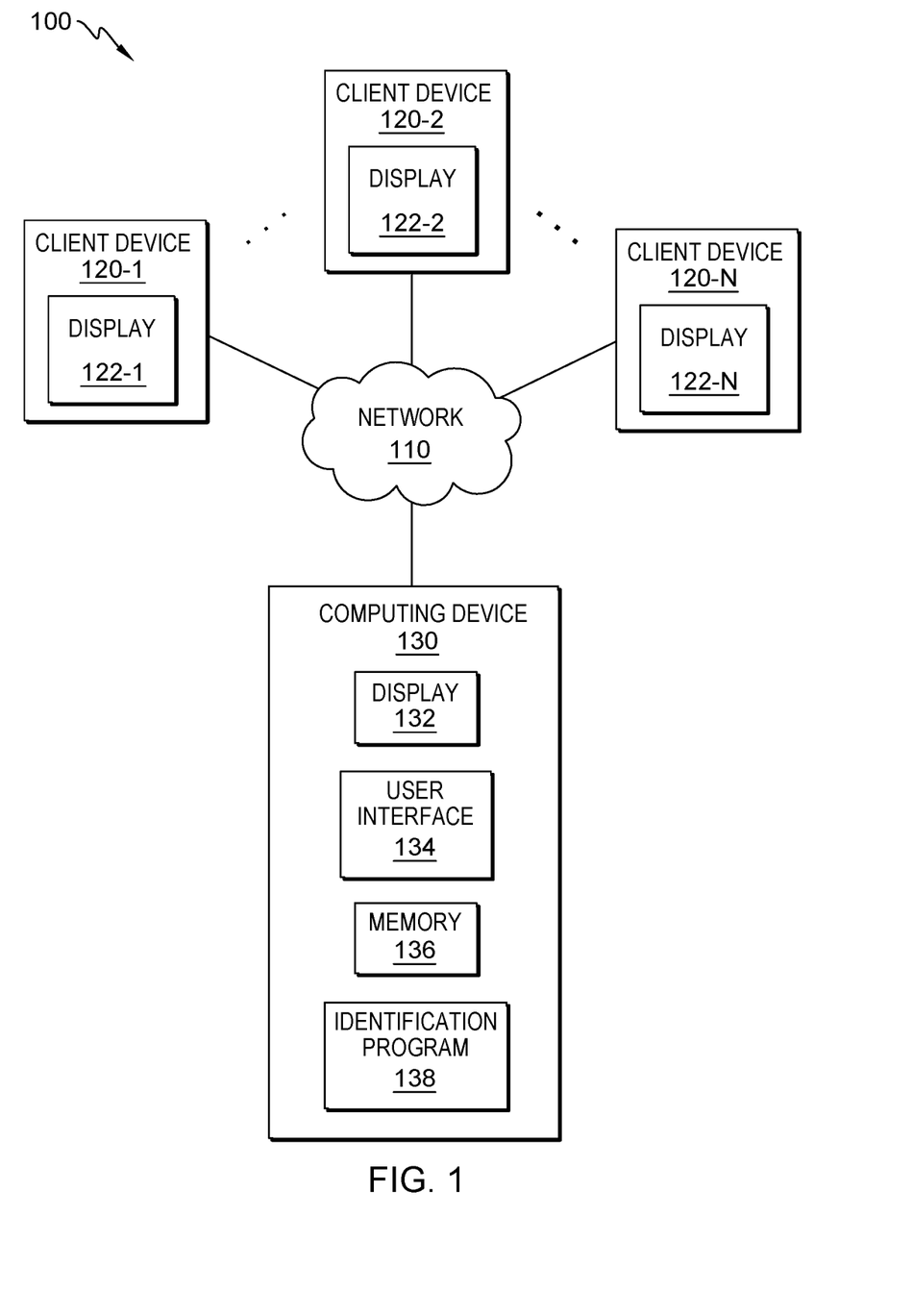
FIG. 1 depicts a functional block diagram illustrating a computing environment which includes a name and acronym identification program, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120-1, client device 120-2, client device 120-N, and computing device 130, interconnected by network 110. In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with client device 120-1, client device 120-2, client device 120-N, and computing device 130 over network 110. For readability, client device 120-N will be used in this document to refer to any of client device 120-1, client device 120-2, client device 120-N, and any other instance of client device 120.

In embodiments of the present invention, client device 120-N and computing device 130 are connected to network 110, which enables client device 120-N and computing device 130 to access other computing devices and/or data not directly stored on client device 120-N and computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120-N, computing device 130, and any other computing devices (not shown in FIG. 1) connected to network 110, in accordance with embodiments of the present invention.

According to an embodiment of the present invention, client device 120-N may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120-N can be a standalone computing device, a management server, a web server, a mobile computing device, or any other electronic device or computing system capable of receiving, transmitting, and processing data. In other embodiments, client device 120-N can represent computing systems utilizing multiple computers as a server system, such as in a cloud computing environment. In certain embodiments, client device 120-N represents a computer system utilizing clustered computers and components (e.g., database server computers, application server computers, etc.) that act as a single pool of seamless resources when accessed by elements of computing environment 100. In general, client device 120-N is representative of any electronic device or combination of electronic devices capable of executing computer readable program instructions. In an embodiment, computing environment 100 includes any number of client device 120-N. Client device 120-N may include internal and external hardware components as depicted and described in further detail with respect to FIG. 4, in accordance with embodiments of the present invention. According to an embodiment of the present invention, client device 120-N includes display 122-N (i.e., client device 120-1 includes display 122-1, client device 120-2 includes display 122-2, and client device 120-N includes display 122-N).

In an embodiment, display 122-N is an electronic visual device for a desktop computer, laptop computer, tablet computer, smartphone, smart-watch, and the like. Display 122-N may include a touchscreen which is an input device layered on top of the display for allowing a user to control an electronic device via simple or multi-touch gestures by touching display 122-N with a special stylus and/or one or more fingers. Display 122-N displays open programs and applications, such as an email program, allowing a user of client device 120-N to interact with the open programs and applications via a keyboard, mouse, and buttons (not shown in FIG. 1). Display 122-N may be a thin film transistor liquid crystal display (TFT-LCD), a flat panel LED (light emitting diode) display, a cathode ray tube (CRT), or any type of display device known in the art or developed in the future. Display 122-N may be connected to computing device 130 via VGA (video graphics array), DVI (digital video interface), HDMI (High Definition Multi-Media Interface), or any other connection type known in the art or developed in the future. According to an embodiment, display 122-N visually presents information from identification program 138 (discussed below) to users of client device 120-N such as names of people and acronym definitions.

According to an embodiment of the present invention, computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 130 can be a standalone computing device, a management server, a web server, a mobile computing device, or any other electronic device or computing system capable of receiving, transmitting, and processing data. In other embodiments, computing device 130 can represent computing systems utilizing multiple computers as a server system, such as in a cloud computing environment. In certain embodiments, computing device 130 represents a computer system utilizing clustered computers and components (e.g., database server computers, application server computers, etc.) that act as a single pool of seamless resources when accessed by elements of computing environment 100. In general, computing device 130 is representative of any electronic device or combination of electronic devices capable of executing computer readable program instructions. In an embodiment, computing environment 100 includes any number of computing device 130. Computing device 130 may include internal and external hardware components as depicted and described in further detail with respect to FIG. 4, in accordance with embodiments of the present invention. In an embodiment, computing device 130 is substantially similar to client device 120-N. According to an embodiment of the present invention, computing device 130 includes display 132, user interface 134, memory 136, and identification program 138.

According to an embodiment, display 132 is an electronic visual device for a desktop computer, laptop computer, tablet computer, smartphone, smart-watch, and the like. Display 132 may include a touchscreen which is an input device layered on top of the display for allowing a user to control an electronic device via simple or multi-touch gestures by touching display 132 with a special stylus and/or one or more fingers. Display 132 displays open programs and applications, such as an email program, allowing a user of computing device 130 to interact with the open programs and applications via a keyboard, mouse, and buttons (not shown in FIG. 1). Display 132 may be a thin film transistor liquid crystal display (TFT-LCD), a flat panel LED (light emitting diode) display, a cathode ray tube (CRT), or any type of display device known in the art or developed in the future. Display 132 may be connected to computing device 130 via VGA (video graphics array), DVI (digital video interface), HDMI (High Definition Multi-Media Interface), or any other connection type known in the art or developed in the future. According to an embodiment, display 132 visually presents information to a user of computing device 130.

In an embodiment, user interface 134 provides an interface between a user of computing device 130 and identification program 138. User interface 134 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 134 may also be mobile application software that provides an interface between computing device 130 and identification program 138. Mobile application software, or an "app," is a computer program designed to run on smartphones, tablet computers and other mobile devices. User interface 134 enables a user of computing device 130 to interact with client device 120-N, identification program 138, any other programs and applications included on computing device 130 (not shown in FIG. 1), and any other computing devices (not shown in FIG. 1).

According to an embodiment, memory 136 is storage that is written to and/or read by identification program 138, and any other programs and applications on computing device 130. In one embodiment, memory 136 resides on computing device 130. In other embodiments, memory 136 resides on client device 120-N or on any other device (not shown in FIG. 1) in computing environment 100, in cloud storage, or on another computing device accessible via network 110. In yet another embodiment, memory 136 represents multiple storage devices within computing device 130. Memory 136 may be implemented using any volatile or non-volatile storage media for storing information, as known in the art. For example, memory 136 may be implemented with a tape library, optical library, one or more independent hard disk drives, multiple hard disk drives in a redundant array of independent disks (RAID), solid-state drives (SSD), or random-access memory (RAM). Similarly, memory 136 may be implemented with any suitable storage architecture known in the art, such as a relational database, an object-oriented database, or one or more tables. In an embodiment of the present invention, identification program 138, and any other programs and applications (not shown in FIG. 1) operating on computing device 130 may store, read, modify, or write data to memory 136. In an embodiment of the present invention, data stored to memory 136 includes, but is not limited to, data stored by identification program 138 such as acronym definitions and nicknames for people.

In an embodiment of the present invention, identification program 138 is a program, a subprogram of a larger program, an application, a plurality of applications, or mobile application software, which functions to dynamically resolve incomplete names and acronyms for participants in an electronic conference (i.e., e-con). Further, the resolved names and acronyms are displayed in real-time for e-con participants via a generated user interface (e.g., a pop-up message) which allows said participants to store the presented information. A program is a sequence of instructions written to perform a specific task. In an embodiment, identification program 138 runs independently. In other embodiments, identification program 138 depends on system software and/or other programs (not shown in FIG. 1) to execute. According to an embodiment, identification program 138 is a cognitive system based on artificial intelligence utilizing machine learning and deep learning that (i) converts speech to text, (ii) identifies a target name or a target acronym, (iii) determines the usage context of the target, and (iv) resolves the target and presents the full name or acronym definition to the e-con participants. In one embodiment, identification program 138 functions as a stand-alone program residing on computing device 130. In another embodiment, identification program 138 works in conjunction with other programs, applications, etc., found in computing environment 100. In yet another embodiment, identification program 138 resides on other computing devices such as client device 120-N in computing environment 100, which are interconnected to computing device 130 via network 110.

According to an embodiment, identification program 138 receives one or more user opt-ins. In the embodiment, identification program 138 retrieves historical information associated with the one or more users. Further in the embodiment, identification program 138 stores the information. Further in the embodiment, identification program 138 receives an indication of an electronic conference (i.e., e-con). Further in the embodiment, identification program 138 identifies a speaker participating in the e-con. Further in the embodiment, identification program 138 converts the speech of the speaker to text. Further in the embodiment, identification program 138 identifies one or more targets in the text. Further in the embodiment, identification program 138 determines whether the target is a name of a person or an acronym. Further in the embodiment, responsive to determining that the target is the name of a person, identification program 138 determines the current usage context of the target. Further in the embodiment, identification program 138 searches the stored history. Further in the embodiment, identification program 138, determines the closest vector and based on the determined closest vector, identifies the name of the target. Further in the embodiment, identification program 138 determines whether the target has opted-in. Responsive to determining that the target has opted-in, identification program 138 displays the full name of the target to the participants of the e-con. Further in the embodiment, responsive to determining that the target is an acronym, identification program 138, determines the current usage context of the target. Further in the embodiment, identification program 138 determines whether the target acronym is identified (i.e., defined) by searching a database of acronyms. Responsive to identifying the target acronym, identification program 138 displays the name (i.e., definition) of the acronym to the participants of the e-con.

Figure 2:
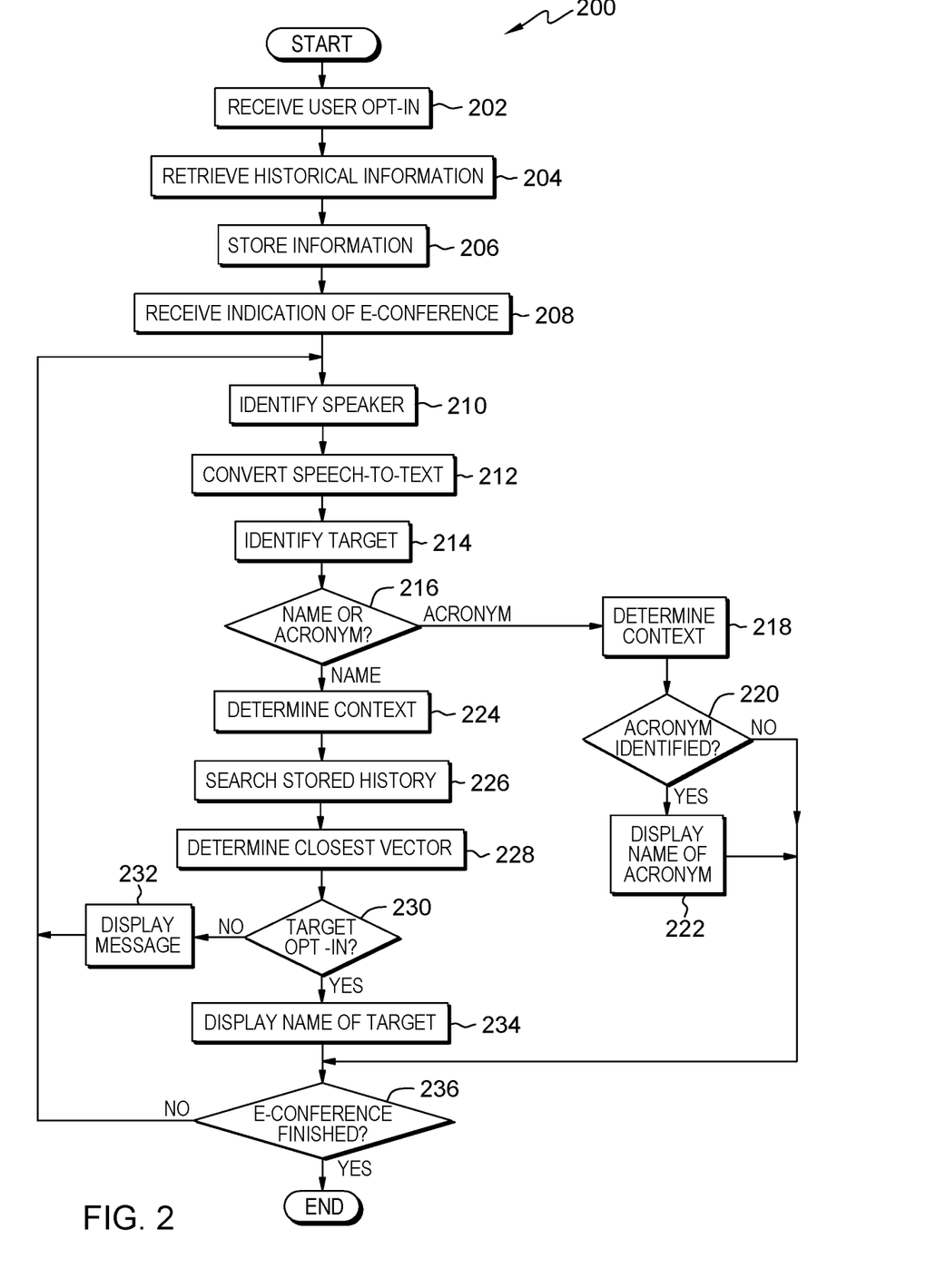
FIG. 2 is a flowchart depicting operational steps of an identification program for dynamically resolving incomplete names and acronyms for participants in an electronic conference, on a computing device within the computing environment of FIG. 1, in accordance with an embodiment of the present invention.

FIG. 2 is a flowchart of workflow 200 depicting a method for dynamically resolving incomplete names and acronyms for participants in an electronic conference. In one embodiment, the method of workflow 200 is performed by identification program 138. In an alternative embodiment, the method of workflow 200 is performed by any other program in computing environment 100 working with identification program 138. In an embodiment, a user of computing device 130 invokes workflow 200 upon initiating an electronic conference (i.e., e-con). In an alternative embodiment, a user of client device 120-N invokes workflow 200 upon joining an e-con.

According to an embodiment of the present invention, identification program 138 receives user opt-in (step 202). In other words, identification program 138 receives an acknowledgement from one or more users to participate (i.e., opt-in) in using identification program 138. In an embodiment, identification program 138 may utilize various accessible data sources that may include personal data, content, or information the one or more users wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting-in to use identification program 138 enables the authorized and secure processing of personal data. Identification program 138 provides informed consent, with notice of the collection of personal data, allowing the one or more users to opt-in or opt-out of processing personal data. Consent can take several forms. Opt-in consent can impose on a user to take an affirmative action before personal data is processed. Alternatively, opt-out consent can impose on the user to take an affirmative action to prevent the processing of personal data before personal data is processed. Identification program 138 provides information regarding personal data and the nature (e.g., type, scope, purpose, duration, etc.) of the processing. Identification program 138 provides the one or more users with copies of stored personal data. Further, identification program 138 allows for the correction or completion of incorrect or incomplete personal data and also allows for the immediate deletion of personal data. According to an embodiment, identification program 138 on computing device 130 receives an opt-in over network 110 from several users of client device 120-N. For example, a program on a company server (located in Michigan) receives an opt-in acknowledgement from each of 'Tom' (in Texas), 'Matt' (in Illinois), 'Evan' (in North Carolina), 'Ross' (in Montana), 'Kya' (in Washington, DC), and 'Lisa' (in Montana); each person is working from home and participating in the same electronic conference (i.e., e-con) for their jobs with 'XYZ Company'.

In an embodiment, identification program 138 retrieves historical information (step 204). In other words, identification program 138, responsive to receiving the user opt-ins, retrieves historical information for each of the users. According to an embodiment, identification program 138 accesses available information and communications (e.g., human resources record, resume, e-mail, text messages, instant messages, social media data and communications, phone calls/messages, etc.) for each opted-in user and analyzes the available information and communications to capture details associated with each user such as nicknames; job titles, roles, and responsibilities; project roles; interpersonal relationships; skills; job history; and the like. In an embodiment, identification program 138 captures relevant information about the several users of client device 120-N by accessing available communications of the several users and analyzing the communications. For example, communications between 'Tom', 'Matt', 'Evan', 'Ross', 'Kya', and 'Lisa' are accessed by the program on the 'XYZ Company' server and are analyzed to capture information. In one e-mail message between 'Kya' and 'Lisa', 'Kya' refers to 'SnowKing' and indicates that 'Ross', the 'SnowKing', is the company hydrology expert, particularly concerning snow.

According to an embodiment of the present invention, identification program 138 stores information (step 206). In other words, identification program 138 stores the captured information associated with each of the opted-in participants. In an embodiment, the stored information includes, but is not limited to, nicknames; job titles, roles, and responsibilities; project roles; interpersonal relationships; skills; job history; previous e-cons and associated targets that have been resolved, and the like. In the embodiment, the information is stored to a local memory, such as memory 136 on computing device 130. Further, the information may be stored to any memory accessible by identification program 138 via network 110. According to an embodiment, identification program 138 stores the captured information to memory 136 on computing device 130. For example, the program on the company server stores the captured information about 'Tom', 'Matt', 'Evan', 'Ross', 'Kya', and 'Lisa' to a database on the server.

In an embodiment, identification program 138 receives indication of an electronic conference (i.e., e-conference or e-con) (step 208). In other words, identification program 138 receives an indication that an e-con is beginning between two or more users. According to an embodiment, identification program 138 receives the indication based on a user action such as the initiation of an e-con application, based on a communication between users (e.g., a meeting notice, an e-mail, etc.), based on a calendar of a user, or based on any other activity indicative of and associated with an e-con. In an embodiment, identification program 138 receives an indication via network 110 that the several users of client device 120-N are opening an e-con application at approximately the same time of the day. For example, 'Tom', 'Matt', 'Evan', 'Ross', 'Kya', and 'Lisa' have all opened the 'Talk Right Now' e-con application at approximately '10:00 AM' on Tuesday morning.

According to an embodiment of the present invention, identification program 138 identifies speaker (step 210). In other words, responsive to receiving an indication of an e-con, identification program 138 begins to identify the current speaker participating in the e-con. In an embodiment, identification program 138 identifies the speaker based on voice recognition technology, based on an agenda associated with the e-con, based on listening and hearing a name associated with the speaker (e.g., "Good morning everyone, my name is Lisa"), or by any other technology known in the art. In the embodiment, identification program 138 identifies the speaker whenever a new speaker participates in the e-con. According to an embodiment, identification program 138 identifies the current speaker participating in the e-con. For example, the program on the 'XYZ Company' server identifies that 'Lisa' is currently speaking during the e-con in which 'Tom', 'Matt', 'Evan', 'Ross', 'Kya', and 'Lisa' are participating.

In an embodiment, identification program 138 converts speech-to-text (step 212). In other words, responsive to identifying the speaker, identification program 138 converts the speech of the speaker to text. According to an embodiment, identification program 138 uses any technology known in the art to convert speech to text. According to the embodiment, identification program 138 converts the speech to text in real-time. In an embodiment, identification program 138 converts, in real-time, the speech of the speaker using client device 120-N to text. For example, the program on the company server converts the speech of Lisa (the identified speaker) to text and Lisa said the following: "Some interesting facts that 'Tom', 'Matt', and 'Evan' may not know—'Kya' is a member of 'HELP', and the 'SnowKing' is Level II certified by 'PSIA-AASI'!".

According to an embodiment of the present invention, identification program 138 identifies target (step 214). In other words, identification program 138 identifies one or more incomplete names, nicknames, acronyms, and any other unidentified content (e.g., abbreviations, etc.) in the text that may be unknown. In an embodiment, identification program 138 uses one or more of a dictionary, the previously stored information, a database of acronyms, available resources on the Internet, natural language processing (NLP), and machine learning (ML) to identify the one or more targets. According to an embodiment, identification program 138 identifies one or more targets in the text of the identified speaker. For example, the program on the company server identifies the following targets in the text of the speaker 'Lisa'—'Lisa', 'Kya', 'HELP', 'SnowKing', and 'PSIA-AASI'.

In an embodiment, identification program 138 determines whether the identified target is a name or an acronym (decision step 216). In other words, responsive to identifying one or more targets in the text of the identified speaker, identification program 138 determines whether said targets are a name of a person or an acronym. According to an embodiment, identification program 138 uses known sentence structures, NLP, and ML to determine whether said targets are a name or an acronym. In one embodiment (decision step 216, ACRONYM branch), identification program 138 determines that at least one target in identified targets is an acronym; therefore, identification program 138 proceeds to step 218 to determine context. In the embodiment (decision step 216, NAME branch), identification program 138 determines that at least one target in the identified targets is a name of a person; therefore, identification program 138 proceeds to step 224 to determine context.

According to an embodiment of the present invention, identification program 138 determines context (step 218). In other words, responsive to determining that the identified target is an acronym, identification program 138 determines the current usage context of said identified target. In an embodiment, identification program 138 reviews and analyzes the text before and after the occurrence of the target. Identification program 138 uses Latent Dirichlet Allocation (LDA), which is a popular NLP tool that can automatically identify topics from a corpus, along with ML, to determine the context of the text. According to an embodiment of the invention, identification program 138 determines the usage context of the identified target which is determined to be an acronym. For example, the program on the 'XYZ Company' server determines that the usage context of identified targets (i.e., 'HELP' and 'PSIA-AASI') used by 'Lisa' is an anecdote during an e-con discussing winter hydrology in the Northwest United States.

In an embodiment, identification program 138 determines whether the acronym is identified (decision step 220). In other words, responsive to determining the usage context of the acronym, identification program 138 determines whether the identified acronyms are identified. According to an embodiment, identification program 138 attempts to identify the acronym using at least one of the following means: searching a known database of acronyms, searching the Internet, searching the full text of the e-con, searching the communication history of the identified speaker, and searching the communication history of the remaining e-con participants. In one embodiment (decision step 220, YES branch), identification program 138 determines that the acronym is identified; therefore, identification program 138 proceeds to step 222 to display the name (i.e., definition) of the acronym. In the embodiment (decision step 220, NO branch), identification program 138 determines that the acronym is not identified; therefore, identification program 138 proceeds to step 236 to determine whether the e-conference is finished.

According to an embodiment of the present invention, identification program 138 displays the name of the acronym (step 222). In other words, responsive to determining that the acronym has been identified, identification program 138 displays the name (i.e., definition) of the acronym to each of the e-con participants. In an embodiment, identification program 138 uses any methodology known in the art (e.g., a pop-up message, an audio message, a text message, an e-mail message, etc.) to display the name of the acronym. In an embodiment, there may be only one identification (i.e., name) of the acronym; in this embodiment, the only one identification is displayed. In another embodiment, there may be more than one identifications (i.e., names) for the acronym; in this embodiment, the more than one identifications are displayed and arranged from most likely to least likely based on the determined usage context of the identified target. According to an embodiment, identification program 138 displays, via a pop-up message shown in display 122-N) the name of the acronym to each of the users of client device 120-N. Once the pop-up message is displayed, identification program 138 proceeds to step 236 to determine whether the e-conference is finished. For example, the program on the company server sends a pop-up message to each of 'Matt', 'Tom', 'Evan', 'Ross', and 'Kya' which indicates that (i) 'HELP' is an acronym for 'Hydrology for Environment, Life, and People' (an environmental initiative) and (ii) 'PSIA-AASI' is an acronym for the 'Professional Ski Instructors of America and the American Association of Snowboard Instructors', of which 'Ross' is a member. The program then determines whether the e-con is completed (i.e., has ended).

In an embodiment, identification program 138 determines context (step 224). In other words, responsive to determining that the identified target is an incomplete name of a person, identification program 138 determines the current usage context of said identified target. In an embodiment, identification program 138 reviews and analyzes the text before and after the occurrence of the target. Identification program 138 searches the communications of the e-con participants, searches the previously stored information and uses NLP/ML to determine the context of the text. According to an embodiment of the invention, identification program 138 determines the usage context of the identified target which is determined to be a name of a person. For example, the program on the 'XYZ Company' server determines that the usage context of the identified targets (i.e., 'Lisa', 'Kya', and 'SnowKing') used by 'Lisa' is an anecdote during an e-con discussing winter hydrology in the Northwest United States.

According to an embodiment, identification program 138 searches stored history (step 226). In other words, responsive to determining that the target is a name of a person and the usage context of the name, identification program 138 searches the previously stored information and the conversation before and after the occurrence of the target being used for names (i.e., first and last names of a person) associated with the target. According to an embodiment of the present invention, identification program 138 searches memory 136 on computing device 130 for names associated with the identified targets. For example, the program on the 'XYZ Company' server searches the stored information concerning the identified speaker 'Lisa' and identifies 'Lisa' as 'Lisa Prusi', and further identifies an e-mail communication between 'Kya' and 'Lisa' which referred to 'Ross', whose full name is 'Ross Saari', as the 'SnowKing'. Further, 'Kya Jones' is a participant in the e-con as indicated in the e-con meeting notice.

In an embodiment, identification program 138 determines closest vector (step 228). In other words, responsive to searching the stored history and not finding a direct match for the target, identification program 138 determines the closest vector which does not exceed a threshold angle between possible matches for the target, thus determining the most similar name. The vector angle is a measure of orientation (or similarity) rather than a measure of magnitude (or size). According to an embodiment, the cosine similarity method, which is well known in the art, is used to determine the closest vector by considering the associated vector angles. When words are similar (e.g., 'France' and 'Italy', or 'Freddy' and 'Frederick'), the vector angle between the pair approaches 'zero' degrees. The cosine of that angle is a value near '1' and thus, the words are similar. When words are not similar (e.g., 'ball' and 'crocodile' or 'Freddy' and 'Frank'), the vector angle for the pair approaches 'ninety' degrees. The cosine of that angle is a value near '0' and thus, the words are not similar. Therefore, a target name of 'Freddy' or 'Frederick' will be determined to be similar to 'Fred Smith' based on the vectors for 'Freddy' and 'Fred', and also for 'Frederick' and 'Fred', having a threshold angle between them approaching 'zero' degrees. According to the embodiment, the threshold angle is determined by identification program 138. According to another embodiment, the threshold angle is determined by a user. For example, a threshold angle can be 'thirty' degrees; thus, any vector angle between 'zero' and 'thirty' degrees indicates similarity. In an embodiment, identification program 138 determines the closest vector between the target and the possible matches in the stored information which does not exceed a threshold; the possible matches stored to memory 136 on computing device 130. For example, the program on the company server determines that 'Kya Jones' has the closest vector to 'Kya', thus 'Kya Jones' is the complete name for the target 'Kya'.

According to an embodiment, identification program 138 determines whether the target has opted-in (decision step 230). In other words, identification program 138 determines whether or not the person, identified as the target, has opted-in to using identification program 138. In an embodiment, identification program 138 retrieves previously stored information concerning user opt-in and opt-out to determine whether the identified person has opted-in to using identification program 138. In one embodiment (decision step 230, NO branch), identification program 138 determines that the person has not opted-in (i.e., has opted-out) of using identification program 138; therefore, identification program 138 proceeds to step 232 to display a message. In the embodiment (decision step 230, YES branch), identification program 138 determines that the person has opted-in to use identification program 138; therefore, identification program 138 proceeds to step 234 to display the name of the target.

In an embodiment, identification program 138 displays message (step 232). In other words, responsive to determining that the target has not opted-in (i.e., has opted-out) to using identification program 138, identification program 138 generates a user interface, transmits a message, and displays said message to the e-con participants via the generated user interface. According to an embodiment, identification program 138 uses any methodology known in the art (e.g., a pop-up message, an audio message, a text message, an e-mail message, etc.) to transmit and display the message. According to the embodiment, the message may include at least one of the following: (i) a blank message; (ii) a message indicating that an e-con user has not opted-in (without identifying said e-con user); (iii) a message indicating that the full name of e-con participant 'User' (e.g., Jen) cannot be displayed for privacy reasons; and (iv) a variation of option (iii) including possible name variations for the user (e.g., user 'Jen' may also be known as 'Jenny', 'Jenni', 'Jennie', 'Jennifer', and/or 'Jenelle'). In an embodiment, identification program 138 on computing device 130 transmits a message to the users of client device 120-N over network 110 and displays said message on display 122-N via a generated user interface. For example, if 'Kya' has not opted-in to using the program on the 'XYZ Company' server, the program would transmit a message to each of 'Tom', 'Matt', 'Evan', and 'Ross' that for privacy reasons, the full name of 'Kya' cannot be displayed.

According to an embodiment, identification program 138 displays name of target (step 234). In other words, responsive to determining that the target has opted-in to using identification program 138, identification program 138 generates a user interface, transmits the name of the target, and displays the name of the target (i.e., person) to the participants of the e-con via the generated user interface. In an embodiment, identification program 138 uses any methodology known in the art (e.g., a pop-up message, an audio message, a text message, an e-mail message, etc.) to transmit and display the message to the e-con participants. In an embodiment, identification program 138 on computing device 130 transmits the name of the user over network 110 to the users of client device 120-N and displays the transmitted name on display 122-N via a generated user interface. For example, the program on the company server transmits a pop-up message to each of 'Tom', 'Matt', 'Evan', and 'Ross' which states that the full name of 'Kya' is 'Kya Jones' and that 'Ross', whose full name is 'Ross Saari', is also known as the 'SnowKing', the transmitted pop-up message is displayed on the computing devices of 'Tom', 'Matt', 'Evan', and 'Ross'. A message is not transmitted to 'Lisa' because 'Lisa' is the identified speaker. Further, a message is not transmitted to 'Kya' because of the previously identified e-mail communication between 'Kya' and 'Lisa', the content of which included the 'SnowKing' nickname for 'Ross Saari' (who goes by 'Ross'). In another example, a message may be displayed to each of 'Tom', 'Matt', 'Evan', 'Ross', and 'Kya' with the size of the message displayed to 'Kya' smaller relative to the size of the message to 'Tom', 'Matt', 'Evan', and 'Ross' because of the knowledge of each of the individuals (i.e., 'Kya' knows the information and thus receives a smaller message in comparison to the other users).

In an embodiment, identification program 138 determines whether the e-conference has finished (decision step 236). In other words, identification program 138 determines whether or not the e-con has finished or is still on-going. According to an embodiment, identification program 138 determines whether the e-con is completed based on identifying a terminated connection, based on no one speaking, based on an announcement that the e-con is over, and any other similar indication. In one embodiment (decision step 236, NO branch), identification program 138 determines that the e-con is not finished; therefore, identification program 138 returns to step 210 to identify the e-con speaker. In the embodiment (decision step 236, YES branch), identification program 138 determines that the e-con has finished; therefore, identification program 138 ends.

Figure 3:
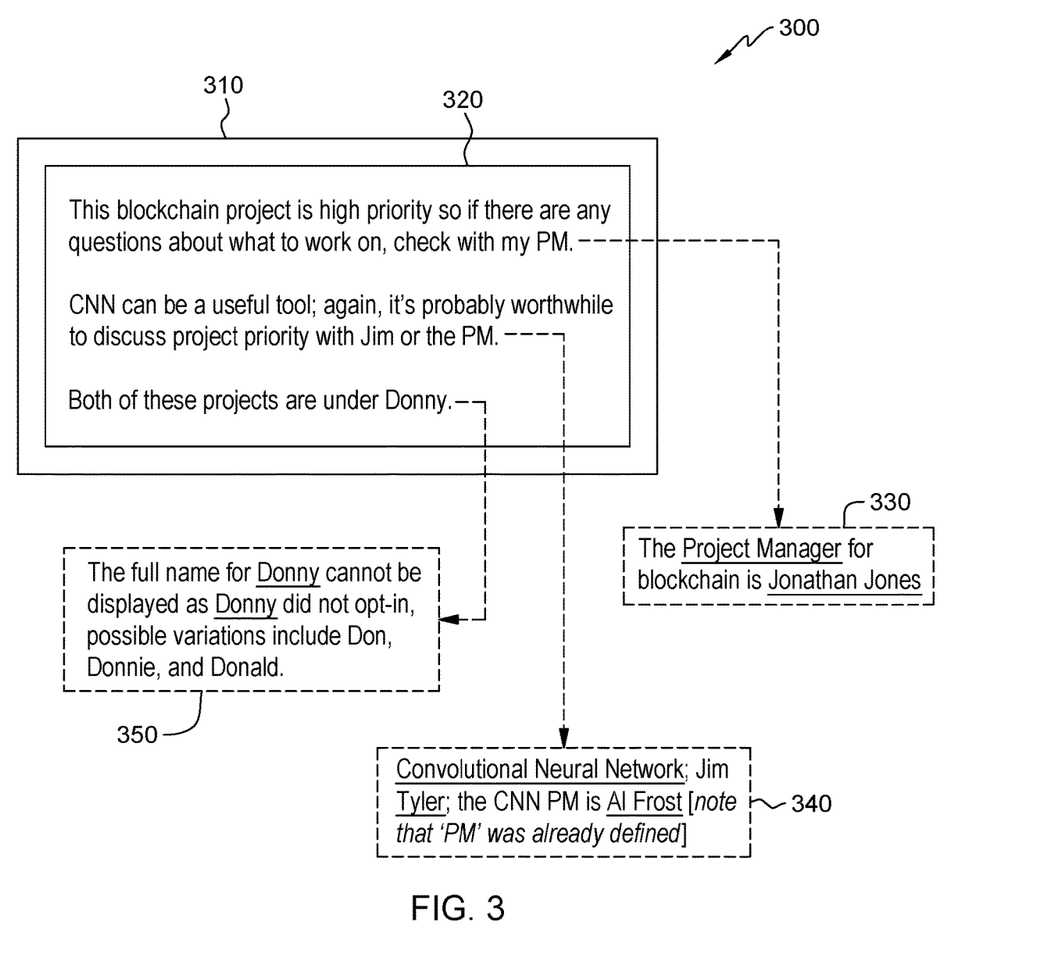
FIG. 3 depicts an example portion of a presentation during an electronic conference, in accordance with an embodiment of the present invention.

FIG. 3 depicts an example portion 300 of a presentation during an electronic conference (i.e., e-con) that has been converted to text, according to one embodiment of the present invention. Example portion 300 includes display 310, which is a display of a participant of the e-con and is substantially similar to display 122-N of FIG. 1. Example portion 300 further includes text 320 which is the speech of the e-con speaker that has been converted to text, and pop-up message 330, pop-up message 340, and pop-up message 350.

As can be seen in text 320, the following targets have been identified and resolved by identification program 138: 'PM', 'CNN', 'Jim', and 'Donny'.

In an embodiment, responsive to identifying one or more targets, identification program 138 generates a user interface, transmits pop-up messages 330, 340, and 350, and displays the transmitted pop-up messages via the generated user interface to each of the e-con participants (as needed). Pop-up message 330 resolves the target acronym 'PM' as 'Project Manager' and further provides that name of said project manager (based on previous information retrieval by identification program 138) as 'Jonathan Jones'. Prior to transmitting/displaying pop-up 330, identification program 138 confirms that 'Jonathan Jones' has opted-in to use identification program 138.

Further in the embodiment, identification program 138 transmits and displays pop-up message 340, which resolves the target acronym 'CNN' as 'Convolutional Neural Network' and the target name 'Jim' as 'Jim Tyler'. Identification program 138 provides the further information (based on the stored information) that the 'CNN PM' is 'Al Frost'. Because 'PM' was previously resolved (i.e., defined), identification program 138 does not resolve it another time. Here again, identification program 138 confirms that 'Jim Tyler' and 'Al Frost' have both opted-in to use identification program 138. If, for example, 'Al Frost' had not opted-in to use identification program 138, the portion of pop-up message 340 which reads "the CNN PM is Al Frost" would not be included.

Further yet in the embodiment, identification program 138 transmits and displays pop-up message 350 which is associated with the target 'Donny'. Here, because 'Donny' has not opted-in to use identification program 138, pop-up message 350 states, in part, that "The full name for Donny cannot be displayed as Donny did not opt-in". In this embodiment, identification program 138 provides possible variations (i.e., alternatives) to 'Donny' which include 'Don', 'Donnie', and 'Donald'. In another embodiment, identification program 138 may not provide alternatives.

According to an embodiment, messages provided by identification program 138 such as pop-up message 330, pop-up message 340, and pop-up message 350, may be displayed for a predetermined amount of time; may be displayed until dismissed by the message recipient; may be stored to a memory by the recipient; if dismissed by the recipient, may be recalled; may be displayed one at a time or in any number at one time; may include a form of highlighting (e.g., underline, bold, color highlight, italics, etc.); and may be displayed as a running list in a sidebar of a display (such as display 122-N) rather than as discrete messages.

In another embodiment, if identification program 138 identifies a target (e.g., 'Joe') that has more than one possible match (e.g., 'Joseph Niles' and 'Joseph Larson') and is unable to resolve the target, identification program 138 may transmit and display a message to the e-con speaker requesting clarification (e.g., "Are you referring to 'Joseph Niles' in Sales or 'Joseph Larson' in Marketing?"). Responsive to receiving an indication from the e-con speaker of the correct name, identification program 138 transmits and displays a message to the e-con participants resolving the target (e.g., 'Joe' is 'Joseph Larson' in the Marketing department).

In yet another embodiment, the resolved target (i.e., name and acronym) is displayed only to the e-con participants that do not know the full name or acronym; i.e., that do not understand the full name or acronym. The embodiment can be achieved as explained in the following two examples. In the first example, based on the retrieved histories of the e-con participants, identification program 138 determines which users were previously made aware of the target (e.g., in prior e-cons or other types of communications). For those e-con participants for whom the target is already known (i.e., those e-con participants who understand the target), the resolved target is not displayed. This embodiment may include a threshold timeframe. For example, if an e-con participant has not seen the full name of the target within the last six months, the target is resolved for (i.e., displayed to) the user.

In the second example, rather than resolving the target, identification program 138 can display a pop-up message to the e-con participants with a message that reads "Do you know this target ("YES" or "NO")?". If the e-con participant responds by selecting the "YES" input, the target is not resolved/displayed. If the e-con participant responds by selecting the "NO" input, the target is resolved and displayed to the e-con participant. Based on responses from the e-con participants, identification program 138 continues to "learn" what each e-con participant knows. Further, the pop-up message may include a button which when pressed by an e-con participant indicates to identification program 138 that the e-con participant is requesting "Do not remind me of this again."

Figure 4:
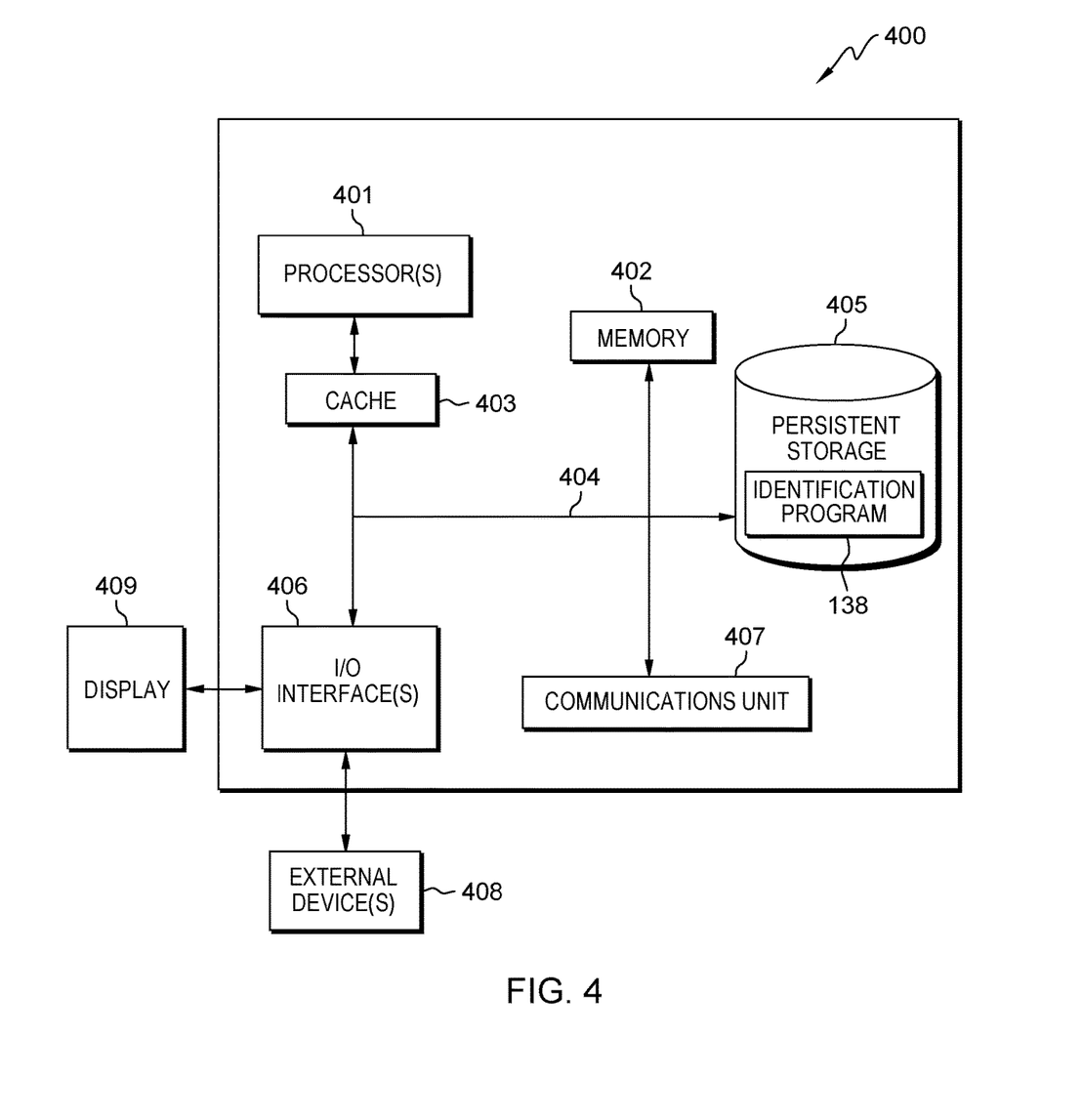
FIG. 4 depicts a block diagram of components of a computing device executing an identification program within the computing environment of FIG. 1, in accordance with an embodiment of the present invention.

FIG. 4 depicts computer system 400, which is an example of a system that includes identification program 138. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   identifying, by one or more computer processors, at least one target in a speech of a first speaker during an electronic conference;
   determining, by one or more computer processors, a closest vector between the identified target and a group of possible matches for the target;
   determining, by one or more computer processors, a most similar match for the identified target based on a current usage context for the identified target, a history of stored information associated with the first speaker and the identified target, and the determined closest vector;
   generating, by one or more computer processors, a user interface for the electronic conference;
   transmitting, by one or more computer processors, a message to a set of participants of the electronic conference via the user interface;
   displaying, by one or more computer processors, the message to the set of participants of the electronic conference via the user interface, wherein the message includes the most similar match, and wherein displaying the message includes providing an audio message;
   determining, by one or more computer processors, that a first participant of the set of participants already understands the identified target based on a history of the first participant;
   determining, by one or more computer processors, that a second participant of the set of participants has not seen a full name of the target within a threshold timeframe; and
   displaying, by one or more computer processors, a resolved target to only the second participant, wherein the resolved target is at least one of a full name of a person and a name of an identified acronym.

2. The method of claim 1, further comprising:
   responsive to determining that the identified target is a name of a person, determining, by one or more computer processors, whether the person associated with the identified target has opt-ed in; and
   responsive to determining that the person associated with the identified target has not opted-in, displaying, by one or more computer processors, a message to the set of participants of the electronic conference.

3. The method of claim 2, further comprising:
   responsive to determining that the person associated with the identified target has opted-in, displaying, by one or more computer processors, a complete name of the person associated with the identified target to the set of participants of the electronic conference; and
   providing, by one or more computer processors, a copy of stored personal data to the person associated with the identified target.

4. The method of claim 2, wherein the displayed message indicates that a complete name of the identified target cannot be displayed as the person associated with the identified target has not opted-in.

5. The method of claim 1, further comprising:
   responsive to determining that the identified target is an acronym, determining, by one or more computer processors, a current usage context for the identified target;
   searching, by one or more computer processors, for the acronym in a communication history of the first speaker and the set of participants of the electronic conference;
   based on the determined current usage context of the identified target and the communication history of the first speaker and the set of participants of the electronic conference, identifying, by one or more computer processors, the acronym; and
   responsive to identifying the acronym, displaying, by one or more computer processors, a name of the identified acronym to the set of participants of the electronic conference.

6. The method of claim 5, wherein displaying, by one or more computer processors, a name of the identified acronym to the set of participants of the electronic conference, comprises:
   displaying, by one or more computer processors, a single name when only one name associated with the identified target is identified; and
   displaying, by one or more computer processors, more than one name when more than one names associated with the identified target are identified, wherein the more than one names are arranged in a display from most likely to least likely based on the determined current usage context of the identified target.

7. The method of claim 1, wherein the closest vector is determined by a cosine similarity method.

8. The method of claim 1, further comprising:
   receiving, by one or more computer processors, an opt-in from one or more users of an electronic conference application;
   retrieving, by one or more computer processors, historical information associated with the one or more users;

storing, by one or more computer processors, the retrieved historical information to a memory;

receiving, by one or more computer processors, an indication of an initiation of the electronic conference application which includes at least two users of the one or more users;

identifying, by one or more computer processors, a first speaker in the electronic conference associated with the initiated electronic conference application; and converting, by one or more computer processors, a speech of the identified first speaker to text.

9. A computer program product, the computer program product comprising:

one or more computer readable storage media; and program instructions stored on the one or more computer readable storage media, the program instructions comprising:

program instructions to identify at least one target in a speech of a first speaker during an electronic conference;

program instructions to determine a closest vector between the identified target and a group of possible matches for the target;

program instructions to determine a most similar match for the identified target based on a current usage context for the identified target, a history of stored information associated with the first speaker and the identified target, and the determined closest vector;

program instructions to generate a user interface for the electronic conference;

program instructions to transmit a message to a set of participants of the electronic conference via the user interface;

program instructions to display the message to the set of participants of the electronic conference via the user interface, wherein the message includes the most similar match, and wherein displaying the message includes providing an audio message;

program instructions to determine that a first participant of the set of participants already understands the identified target based on a history of the first participant;

program instructions to determine that a second participant of the set of participants has not seen a full name of the target within a threshold timeframe; and program instructions to display a resolved target to only the second participant, wherein the resolved target is at least one of a full name of a person and a name of an identified acronym.

10. The computer program product of claim 9, further comprising program instructions stored on the one or more computer readable storage media, to:

responsive to determining that the identified target is a name of a person, determine whether the person associated with the identified target has opt-ed in; and responsive to determining that the person associated with the identified target has not opted-in, display a message to the set of participants of the electronic conference.

11. The computer program product of claim 10, further comprising program instructions stored on the one or more computer readable storage media, to:

responsive to determining that the person associated with the identified target has opted-in, display a complete name of the person associated with the identified target to the set of participants of the electronic conference; and provide a copy of stored personal data to the person associated with the identified target.

12. The computer program product of claim 10, wherein the displayed message indicates that a complete name of the identified target cannot be displayed as the person associated with the identified target has not opted-in.

13. The computer program product of claim 9, further comprising program instructions stored on the one or more computer readable storage media, to:

responsive to determining that the identified target is an acronym, determine a current usage context for the identified target;

search for the acronym in a communication history of the first speaker and the set of participants of the electronic conference;

based on the determined current usage context of the identified target and the communication history of the first speaker and the set of participants of the electronic conference, identify the acronym; and responsive to identifying the acronym, display a name of the identified acronym to the set of participants of the electronic conference.

14. The computer program product of claim 13, wherein the program instructions to display a name of the identified acronym to the set of participants of the electronic conference, comprises:

program instructions to display a single name when only one name associated with the identified target is identified; and program instructions to display more than one name when more than one names associated with the identified target are identified, wherein the more than one names are arranged in a display from most likely to least likely based on the determined current usage context of the identified target.

15. The computer program product of claim 9, wherein the closest vector is determined by a cosine similarity method.

16. The computer program product of claim 9, further comprising program instructions stored on the one or more computer readable storage media, to:

receive an opt-in from one or more users of an electronic conference application;

retrieve historical information associated with the one or more users;

store the retrieved historical information to a memory;

receive an indication of an initiation of the electronic conference application which includes at least two users of the one or more users;

identify a first speaker in the electronic conference associated with the initiated electronic conference application; and convert a speech of the identified first speaker to text.

17. A computer system, the computer system comprising:

one or more computer processors;

one or more computer readable storage media; and program instructions stored on the one or more computer readable storage media for execution by at least one of the one or more computer processors, the program instructions comprising:

program instructions to identify at least one target in a speech of a first speaker during an electronic conference;

program instructions to determine a closest vector between the identified target and a group of possible matches for the target;

program instructions to determine a most similar match for the identified target based on a current usage context for the identified target, a history of stored information associated with the first speaker and the identified target, and the determined closest vector;

program instructions to generate a user interface for the electronic conference;

program instructions to transmit a message to a set of participants of the electronic conference via the user interface;

program instructions to display the message to the set of participants of the electronic conference via the user interface, wherein the message includes the most similar match, and wherein displaying the message includes providing an audio message;

program instructions to determine that a first participant of the set of participants already understands the identified target based on a history of the first participant;

program instructions to determine that a second participant of the set of participants has not seen a full name of the target within a threshold timeframe; and program instructions to display a resolved target to only the second participant, wherein the resolved target is at least one of a full name of a person and a name of an identified acronym.

18. The computer system of claim 17, further comprising program instructions stored on the one or more computer readable storage media for execution by at least one of the one or more computer processors, to:

responsive to determining that the identified target is a name of a person, determine whether the person associated with the identified target has opt-ed in; and responsive to determining that the person associated with the identified target has not opted-in, display a message to the set of participants of the electronic conference.

* * * * *